United States Patent [19]

Ishii et al.

[11] 3,950,257
[45] Apr. 13, 1976

[54] SEMIPERMEABLE MEMBRANE AND PROCESS FOR THE PREPARATION THEREOF

[75] Inventors: Kiyoshi Ishii; Zenjiro Honda, both of Saitama, Japan

[73] Assignee: Daicel Ltd., Osaka, Japan

[22] Filed: Mar. 22, 1974

[21] Appl. No.: 453,965

[30] Foreign Application Priority Data
Mar. 27, 1973  Japan.................................. 48-35206

[52] U.S. Cl............. 210/500 M; 210/23; 260/30.2; 260/30.6 R; 260/30.8 R; 260/30.8 DS; 260/31.2 N; 260/32.6 N; 260/32.8 N; 260/33.2 R; 260/33.4 R; 264/41; 264/331
[51] Int. Cl.²................... B01D 13/04; B01D 39/16; B29D 27/04
[58] Field of Search...... 264/41, 49; 210/22, 500 M, 210/490, 491, 230

[56] References Cited
UNITED STATES PATENTS

| | | | |
|---|---|---|---|
| 3,386,912 | 6/1968 | Lazare .................................. | 210/22 |
| 3,386,913 | 6/1968 | Lazare .................................. | 210/22 |
| 3,661,634 | 5/1972 | Riley et al. .......................... | 264/41 X |
| 3,674,628 | 7/1972 | Fabre ................................... | 264/41 UX |
| 3,709,774 | 1/1973 | Kimura................................. | 210/500 M X |
| 3,737,045 | 6/1973 | Hashimoto et al. ................ | 210/500 M X |
| 3,750,735 | 8/1973 | Chiang et al. ....................... | 210/23 X |
| 3,789,993 | 2/1974 | Brown et al. ........................ | 210/500 M |
| 3,808,303 | 4/1974 | Ganci et al. ......................... | 264/41 |
| 3,819,742 | 6/1974 | Brun et al. ........................... | 210/23 X |
| 3,822,330 | 7/1974 | Gourock et al....................... | 264/41 |
| 3,852,388 | 12/1974 | Kimura................................ | 210/500 M X |

OTHER PUBLICATIONS

Osborn et al., Def. Pub. of Serial No. 800,314, filed Dec. 30, 1968, Published in 884 O.G. 433, on Mar. 9, 1971, Defensive Publication No. T884,001.

*Primary Examiner*—Philip Anderson
*Attorney, Agent, or Firm*—Woodhams, Blanchard and Flynn

[57] ABSTRACT

A semipermeable membrane for ultrafiltration is prepared by
dissolving a copolymer of acrylonitrile (90 to 60 molar percent based on total monomers) and a non-electrolytic water-soluble vinyl monomer (40 to 10 molar percent based on total monomers) in a solvent selected from
  i. one or more water-miscible solvents each having hydrogen bond and dipole parameters within the pentagonal area (3, 6), (5.5, 4), (7.5, 6), (7.5, 10), (6, 10) and (3, 6) as determined by a two-dimensional rectangular coordinate graph, or
  ii. a mixture of (i) and an organic water-miscible solvent in such proportion that the hydrogen bond dipole parameters calculated from weighted averages are within said pentagonal area, forming a film of said resulting solution on a surface and then immersing said film in water.

10 Claims, 2 Drawing Figures

SEMIPERMEABLE MEMBRANE AND PROCESS FOR THE PREPARATION THEREOF

BACKGROUND OF THE INVENTION

1. FIELD OF THE INVENTION

This invention relates to semipermeable membranes and a method of making them, wherein the membrane comprises a copolymer of acrylonitrile and a non-electrolytic, water soluble monomer.

2. DESCRIPTION OF THE PRIOR ART

Polymeric membranes are used as filtration membranes widely in reverse osmosis, ultrafiltration, microfiltration and dialysis. In reverse osmosis, the high molecular weight membranes are used for separating ions or molecules of low molecular weight of not more than several hundreds from solutions. In this case, the membranes are required to be pressure-resistant because a pressure higher than the osmotic pressure of the solution is applied during the process. The processes of ultrafiltration and microfiltration are for the separation of substances of a molecular weight of more than several hundreds. In such cases, the pressure applied is relatively low, i.e., 0.1–15 atms.

SUMMARY OF THE INVENTION

We have discovered that a copolymer of acrylonitrile-water soluble monomer in a special proportion as described below is particularly advantageous for the preparation of an ultrafiltration membrane of improved properties and that a novel semipermeable membrane prepared by dissolving said copolymer is a special solvent or solvent composition and then shaping the resulting solution into a membrane is an excellent one for ultrafiltration. The present invention is based on this discovery.

Figure 1:
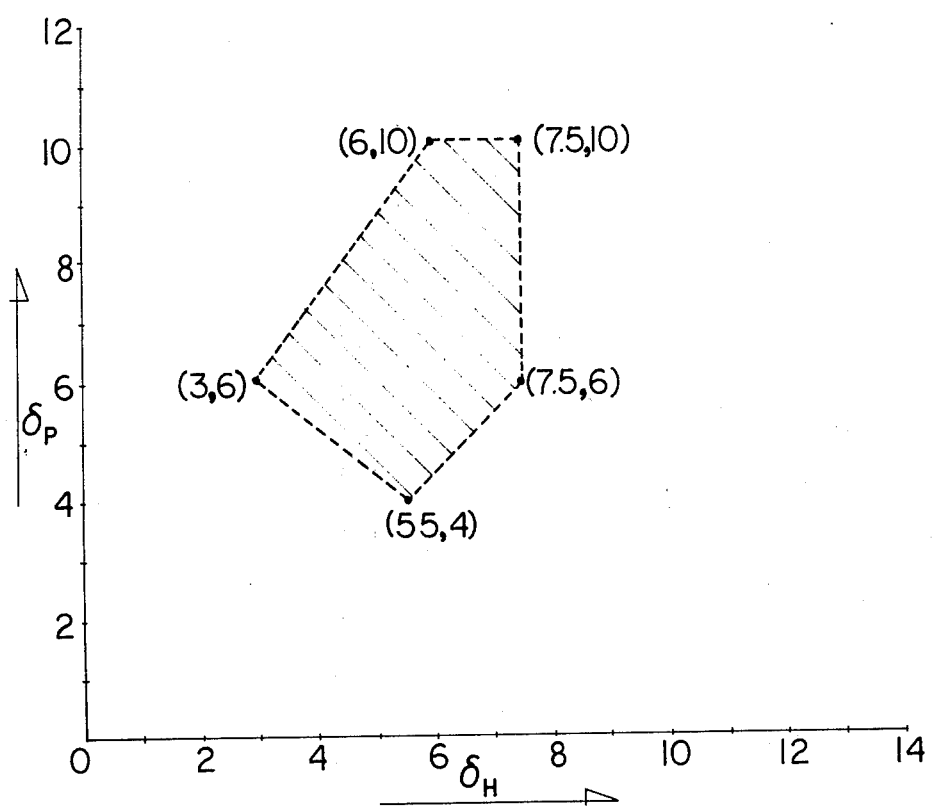
FIG. 1 is a rectangular coordinate graph used coordinates $\delta_H$ and $\delta_P$ and illustrating by the hatched area the properties of the solvents which can be employed in this invention.

This invention relates to a semipermeable membrane for ultrafiltration, consisting essentially of a copolymer of 90 to 60 molar percent of acrylonitrile and the balance, i.e., 40–10 molar percent, is at least one non-electrolytic, water-soluble monomer, said proportions being in monomeric units. The invention also relates to a process for preparing a semipermeable membrane for ultrafiltration, characterized in that a copolymer of 90 to 60 molar percent of acrylonitrile and 40 to 10 molar percent of at least one non-electrolytic, water-soluble monomer (said proportions being in monomeric units) is dissolved in a solvent of the following definition (i) below or a solvent composition of the following definition (ii) below, and the solution is spread upon a surface such as a glass or cloth surface to form a film and then the film is immersed in water to form a semipermeable membrane:

(i) a solvent having coordinates ($\delta_H$, $\delta_P$) which lie within the hatched pentagonal area of FIG. 1 formed by joining coordinate points (3, 6), (5.5, 4), (7.5, 6), (7.5, 10), (6, 10) and (3, 6) successively by straight lines in a two-dimensional graph, wherein the abscissa is the value due to hydrogen bond ($\delta_H$) of the total solubility parameter ($\delta_T$) and the ordinate is the value due to dipole ($\delta_P$) of said same total solubility parameter, as the coordinate rectangular axes, which solvent is miscible with water in any proportion so that any remaining solvent is removed from the film when the film is immersed in water to form the membrane, and which solvent can be used alone or in the form of a mixture of two or more members of (i), and (ii) a solvent composition comprising one or more of the solvents (i) and an organic compound miscible with water in any proportion in such an amount that said copolymer is soluble therein with the proviso that the apparent coordinates of $\delta_H$ and $\delta_P$ ($\delta_H$, $\delta_P$) calculated from the weighted averages of the constituents of said solvent composition are within the said hatched pentagonal area of (i).

The copolymer of acrylonitrile and the non-electrolytic, water-soluble monomer, used in the present invention, can be prepared easily by the mass polymerization process; or by the solution polymerization process, using an oil-soluble radical initiator such as benzoyl peroxide or $\alpha,\alpha'$-azobisisobutyronitrile; or by the precipitation polymerization process wherein there is used a solvent such as benzene or acetone which dissolves the monomers but does not dissolve the resulting polymer.

The non-electrolytic, water-soluble monomers used in the present invention are those vinyl monomers that are non-electrolytic and water-soluble, and the homopolymers of which are also water-soluble. Examples of the monomers are N-vinyl-2-oxazolidone, N-vinyl-2-pyrrolidone, acrylamide, acryloylmorpholine, hydroxyethyl methacrylate, hydroxypropyl methacrylate, methoxyethyl acrylate, ethoxyethyl methacrylate, 1,2-dihydroxypropyl acrylate, 1,2-dihydroxypropyl methacrylate, 2,3-dihydroxypropyl acrylate, 2,3-dihydroxypropyl methacrylate, 1,3-dihydroxypropyl acrylate and 1,3-dihydroxypropyl methacrylate.

The toughness of the member prepared from the copolymer of acrylonitrile and the non-electrolytic, water-soluble monomer is improved but the velocity of permeation is reduced as the proportion of acrylonitrile in the polymer is increased. On the other hand, the velocity of water permeation is increased but the toughness of the membrane is reduced as the proportion of the non-electrolytic, water-soluble vinyl monomer is increased.

If a membrane of an insufficient toughness is used for the separation of constituents of the solution that is treated, the membrane is apt to be broken by the pressure of the solution and the velocity of water permeation is reduced during use due to the increase of the membrane compactness. Therefore, reduction in capacity of the membrane is marked in long term use of such a membrane.

Accordingly, in the copolymer of arylonitrile and the non-electrolytic, water-soluble monomer used in the present invention, the proportion off acrylonitrile must be 90 to 60 molar percent, preferably 80-65 molar percent, based on the total monomer units. As shown in the Comparison Examples given below, if the proportion of acrylonitrile is not within that range, the desired excellent semipermeable membrane for ultrafiltration of the present invention is not obtained and the copolymer is difficulty soluble in the solvent or solvent composition used in the present invention which will be illustrated below.

In the preparation of the membrane for ultrafiltration of the present invention, copolymers wherein the proportion of the non-electrolytic, water-soluble monomer is 10 to 40 molar percent, based on the total monomer units, is satisfactory but the preferred proportion is 20 to 35 molar percent.

The term "velocity of water permeation" employed in this specification indicates the volume of water that permeates through the membrane ($m^3$)/surface area of the membrane ($m^2$)/permeation time of one day.

The semipermeable membrane of the present invention is prepared in the following manner. A copolymer of acrylonitrile and a non-electrolytic, water-soluble monomer prepared by, for example, solution polymerization, as described above, is dissolved in, for example, dimethylformamide to obtain a solution having a copolymer concentration of 3 wt. percent or less. The solution is subjected to reprecipitation with methanol and the precipitate is dried. The precipitated product is treated in the next step. If the copolymer is prepared by the precipitation polymerization method, the copolymer as filtered and then precipitated can be used without any further treatment.

The copolymer thus obtained is dissolved in a solvent (i) or a solvent composition (ii) which will be described below. As the concentration of the copolymer in the solution thereof in the solvent (i) or solvent composition (ii) is increased, the resulting membrane has a higher (greater) toughness, but a lower permeation velocity. On the other hand, as the concentration of the copolymer is decreased, the permeation velocity of the membrane is increased but the toughness thereof is decreased.

Accordingly, depending on the toughness and permeability desired, the concentration of the copolymer in the membrane-forming solution thereof in the solvent (i) or solvent composition (ii) can be in the range of 10 to 35 wt. percent, preferably 18 to 27 wt. percent.

Though the viscosity of the membrane-forming solution is not particularly critical, a forming solution having a viscosity in the range of 20 to 600 poises at the spreading temperature can be used. A preferred viscosity range is 60 to 200 poises.

Then the solution is spread on a surface such as a glass plate or cloth preferably at a predetermined temperature in the range of 10° to 85° C, with a doctor blade or an applicator to form a film a thickness of 0.1 to 0.30 mm, preferably 0.15 to 0.25 mm. The solvent of the forming solution is evaporated at a temperature of 10° to 85° C, preferably 25° to 50° C, for example by heating for a predetermined period of time in the range of 3 to 300 seconds. The membrane is then immersed in water, preferably ice-water to obtain the desired product.

By varying the temperature and the evaporation time, the properties of the membrance can be varied relatively freely. If a higher temperature is employed, the evaporation time can be reduced. Evaporation of the solvents at a temperature not higher than room temperature is slow or negligible, because many of the solvents which can be used in the present invention have relatively high boiling points. It is considered that the solvents absorb moisture of the ambient air. Accordingly, spreading at a temperature not higher than room temperature is apt to be influenced by humidity.

The solvents defined in (i) used in the present invention will be illustrated in more detail below.

The solvents used in the present invention are miscible with water in any proportion and have solubility parameters which will be shown below. The solubility parameter ($\delta$) herein indicates an index represented by (cohesive energy density)$^{1/2}$.

The total solubility parameter ($\delta_T$) comprises the parameter due to hydrogen bond ($\delta_H$), the one due to dipole ($\delta_P$) and the one due to dispersion force ($\delta_D$). Namely, $\delta_T^2 = \delta_H^2 + \delta_P^2 + \delta_D^2$. The factor depending on dispersion force ($\delta_D$) does not vary much for different solvents and for many purposes differences can be disregarded. Accordingly, if the differences in $\delta_D$ of respective solvents is disregarded, then all solvents can be plotted on a two-dimensional graph with the values of $\delta_H$ and $\delta_P$ as rectangular coordinate axes as shown in FIG. 1.

There has been known a process wherein the coordinates ($\delta_H$, $\delta_P$) are employed as a standard for the selection of a solvent in the preparation of a polymeric membrane to be used for separation of components of a solution (Ind. Eng. Chem. Prod. Res. Develop., 11 (2), 207 (1972), Elis Klein & James K. Smith).

The values, $\delta_H$ and $\delta_P$, used in the present invention, are quoted from Hansen, C. M., Ind. Eng. Chem. Prod. Res. Develop., 8, 2 (1969) and Hansen, C. M., Beerbower, A., "Solubility Parameter," "Encyclopedia of Chemical Technology" Suppl. vol., Wiley Intersciences, New York, N.Y., 1971.

The coordinates ($\delta_H$, $\delta_P$) of the solvents used in the present invention must be within the hatched area in FIG. 1, i.e., within the pentagon formed by joining coordinates (3, 6), (5.5, 4), (7.5, 6), (7.5, 10), (6, 10) and (3, 6) successively by straight lines. Examples of such solvents are, dimethylsulfoxide (5.0, 8.0), dimethyl sulphone (6.0, 9.5), 2-pyrrolidone (5.5, 8.5), N-methyl-2-pyrrolidone (3.5, 6.0), hexamethylene phosphoamide (5.5, 4.2), dimethylacetamide (5.5, 5.6) and dimethylformamide (5.5, 6.7).

With solvents which are not within the hatched area of FIG. 1, the preparation of the membrane is either impossible or, if possible, the velocity of water permeation is poor. Moreover, neither acetic acid anhydride nor triethyl phosphite can be used as the solvent because they are miscible with water in a limited proportion, although they are within the dotted lines in FIG. 1. They do not dissolve the copolymer of acrylonitrile and non-electrolytic, water-soluble monomers of the present invention.

The solvents can be used singly or in the form of a mixture of two or more members of (i). Further, organic compounds (additives) which are not within the dotted lines in FIG. 1 can be added to the solvent (i) in a quantity which does not impair the dissolution of the copolymer in order to make a solvent composition (ii). The additives must also be miscible with water in any proportion.

The additives include, for example, methanol, ethanol, n-propyl alcohol, isopropyl alcohol, t.-butyl alcohol, ethylene glycol, glycerin, propylene glycol, 1,4-butanediol, ethylene glycol monomethyl ether, ethylene glycol monoethyl ether, ethylene glycol monobutyl ether, ethanolamine, diethyltriamine, dipropylene glycol, formamide, formic acid, propionic acid, butyric acid, diacetone alcohol, acetone, acetol, acetonitrile, γ-butyrolactone, ethylene cyanohydrin and ethylene chlorohydrin.

Also, the apparent coordinates ($\delta_H$, $\delta_P$) of the solvent composition (ii) comprising those additives and said solvent (i) must be within the dotted lines in FIG. 1. The apparent $\delta_H$ and $\delta_P$ of the mixture are weighted averages of the respective values of the components of the composition.

For example, in a mixture comprising 2 parts of dimethylformamide and 1 part of formamide, the values of $\delta_H$ and $\delta_P$ of the mixture are calculated as follows:

$$\delta_H = 5.5 \times \frac{1}{2+1} + 9.3 \times \frac{1}{2+1} = 6.77$$

$$\delta_P = 6.7 \times \frac{1}{2+1} + 12.8 \times \frac{1}{2+1} = 8.73$$

(dimethylformamide: $\delta_H = 5.5, \delta_P = 6.7$)

(formamide: $\delta_H = 9.3, \delta_P = 12.8$)

The pore diameter of the upper compact layer of the semipermeable membrane can be varied as desired by changing the type and amount of the additives. Consequently, the velocity of water permeation and the retention rate of the solute are variable. If a solvent (i) having coordinates ($\delta_H, \delta_P$) not within the hatched area in FIG. 1 or a solvent composition (ii) having the apparent coordinates ($\delta_H, \delta_P$) not within the hatched area in FIG. 1 is used, a membrane having a practical mechanical strength is not obtained or, if such membrane can be prepared, the velocity of water permeation is lower than that of a membrane having coordinates within the hatched area.

The retention rate of the solute is represented by the following formula:

$$100 \times \left(1 - \frac{\text{Concentration of the substantial solute in the solution after the permeation}}{\text{Concentration of the substantial solute in the solution to be subjected to the permeation}}\right)$$

Figure 2:
FIG. 2 is a scanning electron-microscopic photograph of the cross section of a semipermeable membrane obtained according to the present invention.

The semipermeable membrane obtained according to this invention comprises one compact layer situated as an outer finepored surface layer and the opposite large-pored porous layer as shown in FIG. 2.

FIG. 2 is a scanning electron-microscopic photograph (x800) of the cross section of a membrane prepared in the same manner as in Example 1 which will be given below, but at a spreading temperature of 20° C instead of 50° C.

The solute is retained by the compact (upper) layer. The pore diameter of the porous large pored layer is at least 10 times larger, and preferably larger than 10–100 fold that of the compact layer and the pores thereof are open. Therefore, clogging does not easily occur. Even if clogging occurs, the original properties of the membrane can be recovered easily by washing same with water or by rubbing-washing. See U.S. Ser. No. 282,449.

The novel semipermeable membranes for ultrafiltration obtained according to the present invention have a velocity of distilled water permeation of 1.2–100 m³/m²/day under a pressure of 3 kg/cm². The membranes have retention rates ranging from less than 5 percent under a pressure of 3 kg/cm² (aqueous NaCl solution having 3500 ppm. of NaCl) to more than 50 percent (Sirius Supra Green, molecular weight 1086; a substantive dye of Farbenfabriken Bayer A.G., Germany) under a pressure of 10 kg/cm².

The novel semipermeable membrane obtained according to the present invention can be used for various paractical purposes. For example, the membranes can be used for the separation of edible protein extracts such as cheese whey and soybean whey into protein and organic compounds of molecular weights of less than several hundreds, for the concentration of protein, the concentration of protein extracts of milk, egg whites and juices, separation and concentration of high molecular compounds and colloids, and waste water processing or concentration in the starch industry.

DETAILED DESCRIPTION OF THE INVENTION

The present invention will be further described by reference to the following illustrative Examples.

EXAMPLE 1

A. Preparation of copolymer

Three grams of $\alpha,\alpha'$-azobisisobutyronitrile were added to 106 g of acrylonitrile, 44 g of N-vinyl-2-pyrrolidone and 1200 g of toluene. The polymerization was effected in a nitrogen stream under stirring at 60° C for 5 hours. After filtration through a glass filter, the product was dried under vacuum at 50° C for 24 hours. Yield 68.3 percent. According to nitrogen analysis, it was determined that the resulting copolymer comprised 73 molar percent of acrylonitrile units and 27 molar percent of N-vinyl-2-pyrrolidone units. In dimethylformamide as solvent, $\eta_{SPIC}$ of the copolymer product was 1.26 d$l$/g at 25° C.

B. Preparation of a membrane 10 grams of the copolymer were dissolved in 40 g of dimethyl sulfoxide and the resulting membrane-forming solution was heated to 50° C. After defoaming, the solution was spread on a glass plate heated to 50° C with a doctor blade to form a film of 0.25 mm as cast thickness. After evaporation of the solvent for 2 minutes, the membrane was immersed in ice-water together with the glass plate.

C. Properties of the membrane

I Velocity of distilled water permeation of the membrane at a flow velocity on the membrane surface of 1.2 m/sec. under a pressure of 3 kg/cm² was 3.7 m³/m²/day.

II Under the same conditions as in C-(I) except that chesse whey (5.92 wt. percent solid content) was used in place of water, protein retention rate of 95.5 percent, lactose retention rate of 8.5 percent and salt retention rate of 3.0 percent were obtained. The velocity of water permeation was 1.1 m³/m²/day.

III Under the same conditions as in C-(I) except that waste water (COD 1100 ppm., conductivity 1900 $\mu v$/cm) from a boiled fish-paste manufacturing plant was used in place of water, COD retention rate was 23.1 percent and electric conductivity retention rate was 46.5 percent.

IV Under the same conditions as in C-(I) except that 1 percent aqueous solution of Sirius Supra Green (a substantive dye of Farbenfabriken Bayer A.G., Germany; molecular weight 1086) was used, a retention rate of 99.9 percent was obtained. Permeation velocity was 2.0 m³/m²/day.

V Permeation test was effected under the conditions as in C-(I) except that a 5 percent aqueous solution of dextran of a molecular weight of 60,000 was used in place of water.

Permeation velocity was 0.92 m³/m²/day, and the retention rate was 35 percent.

VI Permeation test was effected under the same conditions as in C-(I) except that soybean whey (sugar 6300 ppm, protein 5800 ppm, conductivity 4300 μʊ/cm) was used in place of water. Permeation velocity was 1.3 m³/m²/day. Sugar retention rate of 4.0 percent, protein retention rate of 74.8 percent and conductivity retention rate of 0 percent were obtained.

EXAMPLE 2

A. Preparation of copolymer 0.15 gram of $\alpha,\alpha'$-azobisisobutyronitrile was added to 23.65 g of acrylonitrile, 6.35 g of acrylamide and 40g of dimethylformamide. The polymerization was effected in a nitrogen stream at 60° C for 5 hours. After completion of the polymerization, the mixture was diluted with dimethylformamide to 10-fold volume and reprecipitation was effected with methanol. Then, the product was dried under vacuum at 50° C for 24 hours.

According to nitrogen analysis, the acrylonitrile content of the resulting copolymer was 69.4 molar percent. In dimethylformamide as solvent, $\eta_{sp/c}$ of the product was 1.29 $dl/g$ at 25° C.

B. Preparation of a membrane

The same procedure as in Example 1-B was repeated except that dimethylformamide was used in place of dimethyl sulfoxide and the temperature of the solution and glass plate was 20° C instead of 50° C.

C. Properties of the membrane

I Testing of the membrane was effected under the same conditions as in Example 1-C-(I). Permeation velocity of distilled water was 2.0 m³/m²/day.

(II) Testing of the membrane was effected under the same conditions as in Example 1-C-(II). Permeation velocity was 0.82 m³/m²/day. A protein retention rate of 96.2 percent, lactose retention rate of 15.3 percent and salt retention rate of 4 percent were obtained.

The results of the above Examples 1 and 2 are summarized in Table I together with those of Examples 3 – 10.

EXAMPLE 3 – 7

The properties of additional membranes were tested under the same conditions as in Example 1, except that the copolymer in Example 1 was replaced with copolymers as listed in Table 1 and dimethyl sulfoxide was replaced with dimethylformamide.

The results are shown in Table I.

EXAMPLE 8

The preparation of copolymer and membrane and testing of the resulting membrane were effected in the same manner as in Example 2 under the same conditions as in Example 2 except that N-vinyl-2-pyrrolidone was replaced with hydroxyethyl methacrylate.

The results are shown in Table I.

EXAMPLE 9

The preparation of copolymer and membrane and testing of the resulting membrane were effected in the same manner as in Example 2 under the same conditions as in Example 2 except that N-vinyl-2-pyrrolidone was replaced with acryloylmorpholine.

The results are shown in Table I.

EXAMPLE 10

The preparation of copolymer and membrane and testing of the resulting membrane were effected in the same manner as in Example 1 under the same conditions as in Example 1 except that dimethyl sulfoxide was replaced with hexamethylene phosphoamide.

The results are shown in Table I.

Table I

| Example | Solvent used in the preparation of membrane | Comonomer | (amount) (molar %) | Permeation velocity of distilled water (m³/m²/day) | Permeation velocity | Cheese whey Protein retention rate (%) | Lactose retention rate (%) | Salt retention rate (%) |
|---|---|---|---|---|---|---|---|---|
| 1 | Dimethyl sulfoxide | N-vinyl-2-pyrrolidone | 27 | 3.7 | 1.1 | 96.5 | 8.5 | 3.0 |
| 2 | Dimethylformamide | Acrylamide | 30.6 | 2.0 | 0.82 | 96.2 | 15.3 | 4 |
| 3 | '' | N-vinyl-2-pyrrolidone | 22 | 3.0 | 0.91 | 95.8 | 11.0 | — |
| 4 | '' | '' | 32 | 5.2 | 0.8 | 95.3 | 9.0 | — |
| 5 | '' | '' | 40 | 8.0 | 0.75 | 95.3 | 9.3 | — |
| 6 | '' | N-vinyl-2-oxazolidone | 28 | 39 | 0.83 | 96.0 | 13.2 | — |
| 7 | '' | Acryloylmorpholine | 29 | 39.7 | 0.85 | 95.4 | 8.8 | — |
| 8 | Dimethyl sulfoxide | Hydroxyethyl methacrylate | 20.4 | 14.4 | 1.17 | 96.0 | 14.5 | — |
| 9 | Dimethylformamide | Acryloylmorpholine | 28 | 16.2 | 0.85 | 96.0 | 12.8 | — |
| 10 | Hexamethylene phosphoamide | N-vinyl-2-pyrrolidone | 27 | 7.8 | 1.07 | 95.8 | 9.5 | 2.8 |

| Example | 1% Aqueous solution of Sirius Supra Green Permeation velocity (m³/m²/day) | Retention rate (%) | 5% Aqueous solution of dextran (molecular weight 60,000) Permeation velocity (m³/m²/day) | Retention rate (%) | Solvent | $\eta_{sp/c}$ Temp. g/dl |
|---|---|---|---|---|---|---|
| 1 | 2.0 | 99.9 | 0.92 | 35 | Dimethylformamide | 25°C 1.26 |
| 2 | 2.1 | 99.9 | — | — | '' | 25°C 1.29 |
| 3 | 1.9 | 100 | — | — | '' | 25°C 1.27 |
| 4 | 2.0 | 99.8 | — | — | '' | 25°C |

Table I-continued

| Example | Solvent used in the preparation of membrane | Comonomer (amount) (molar %) | Permeation velocity of distilled water (m³/m²/day) | Cheese whey Permeation velocity | Protein retention rate (%) | Lactose retention rate (%) | Salt retention rate (%) |
|---|---|---|---|---|---|---|---|
| 5 | | 2.0 | 99.8 | — | — | " | 1.26 25°C |
| 6 | | 1.9 | 100 | — | — | Dimethyl-sulfoxide | 1.23 30°C 0.52 |
| 7 | | 2.0 | 99.9 | — | — | Dimethyl-formamide | 25°C 1.12 |
| 8 | | 2.0 | 100 | — | — | " | 25°C 0.98 |
| 9 | | 2.0 | 100 | — | — | " | 25°C 0.84 |
| 10 | | 2.0 | 100 | 0.88 | 30 | " | — |

EXAMPLES 11-20

Membranes were prepared in exactly the same manner as in Example 1 by using the solution used in Example 1-B except that the glass plate temperature of 50° C and the evaporation time of 120 seconds were changed as shown in Table II. Testing of the properties of the membranes was effected in the same manner as in Example 1-C.

The results are shown in Table II.

EXAMPLE 27

A membrane was prepared in the same manner as in Example 1 except that a solution comprising 20 wt. percent of a copolymer of 69 molar percent of acrylonitrile and 31 molar percent of N-vinyl-2-pyrrolidone, 44 wt. percent of dimethylformamide and 36 wt. percent of acetonitrile was used and that the spreading was effected at 20° C. According to permeation test of 1 percent aqueous solution of Sirius Supra Green under a Table II

| Example | Spreading temperature (glass plate temp.) (°C) | Evaporation time (sec.) | Permeation velocity of distilled water (m³/m²/day) | Cheese whey Permeation velocity (m³/m²/day) | Protein retention rate (%) |
|---|---|---|---|---|---|
| 11 | 80 | 30 | 1.40 | 0.77 | 96.2 |
| 12 | 80 | 120 | — | 0.60 | 96.0 |
| 13 | 65 | 30 | 1.14 | 0.9 | 95.3 |
| 14 | 65 | 120 | 2.2 | 0.62 | 96.5 |
| 15 | 50 | 30 | 23.7 | — | — |
| 16 | 50 | 60 | 5.0 | 0.55 | 96.8 |
| 17 | 50 | 120 | 3.7 | 1.0 | 95.5 |
| 18 | 50 | 300 | 2.27 | 0.87 | 96.2 |
| 19 | 35 | 120 | 16.2 | 0.61 | 95.3 |
| 20 | 20 | 120 | 5.3 | 1.09 | 95.0 |

EXAMPLES 21-26

The same procedure as in Example 1 was repeated except that copolymer solutions were prepared by using solvent systems shown in Table III in place of dimethyl sulfoxide. The results are shown in Table III.

pressure of 10 kg/cm², retention rate of Sirius Supra Green was 62.0 percent and permeation velocity was 1.6 m³/m²/day.

COMPARISON EXAMPLE 1

The procedure of Example 11 was repeated except that dimethylformamide was replaced with formamide having coordinates ($\delta_H, \delta_P$) of (9.3, 12.8) which are not within the hatched area in FIG. 1. After spreading and Table II

| Example | Solvent system A | (wt.%) | B | (wt.%) | Apparent $\delta H$ | $\delta P$ | Permeation velocity of distilled water (m³/m²/day) | Cheese Whey Permeation velocity | Protein retention rate | Dextran Permeation velocity | Retention rate |
|---|---|---|---|---|---|---|---|---|---|---|---|
| 21 | Dimethyl-formamide | 75 | Formamide | 5 | 5.74 | 7.08 | 2.21 | 0.88 | 95.5 | 0.92 | 33 |
| 22 | " | 70 | " | 10 | 5.98 | 7.46 | 15.4 | 0.85 | 95.2 | — | — |
| 23 | " | 60 | " | 20 | 6.45 | 8.23 | 45.0 | 0.92 | 95.4 | — | — |
| 24 | " | 45 | " | 35 | 7.16 | 9.36 | 55.3 | 1.0 | 95.5 | — | — |
| 25 | " | 60 | Hexamethylene phosphoamide | 20 | 5.5 | 6.08 | 2.47 | 0.80 | 96.0 | — | — |
| 26 | " | 70 | Dipropylene glycol | 10 | 5.94 | 7.10 | 28.3 | 0.90 | 95.0 | — | — | immersion in ice-water, no membrane was obtained, but a flocculent polymer precipitated.

COMPARISON EXAMPLES 2-4

The procedure of Example 1 was repeated except that dimethyl sulfoxide was replaced with ethylene cyanohydrin having coordinates ($\delta_H, \delta_P$) of (8.6, 9.2) which are not within the hatched area in FIG. 1 and that the preparation conditions (temperature of solution and glass plate and evaporation time) were as shown in Table IV. The permeation velocities were low in all cases.

Table IV

| Comparison Example | Preparation conditions | | Permeation velocity of distilled water (m³/m²/day) |
|---|---|---|---|
| | Temperature of solution and glass plate (°C) | Evaporation time (sec.) | |
| 2 | 20 | 60 | 0.25 |
| 3 | 50 | 120 | 0.21 |
| 4 | 80 | 30 | 0.07 |

COMPARISON EXAMPLE 5

The polymerization was effected in the same manner as in Example 1-A except that 44 g of N-vinyl-2-pyrrolidone were replaced with 1 g of N-vinyl-2-oxazolidone.

According to nitrogen analysis, it was determined that the resulting polymer comprised 91 molar percent of acrylonitrile and 9 molar percent of N-vinyl-2-oxazolidone. A membrane was prepared and examined in the same manner as in Example 1-B and 1-C. Water permeation velocity of 0.8 m³/m²/day [C-(I)] and cheese whey permeation velocity of 0.2 m³/m²/day [C-(II)] were obtained. Thus, the permeation velocities were lower than those of Example 1.

COMPARISON EXAMPLE 6

1.0 gram of acrylonitrile, 2.0 g of N-vinyl-2-oxazolidone, 15 cc. of toluene and 0.015 g of azobisisobutyronitrile were charged in an ampoule under nitrogen atmosphere and sealed. The polymerization was effected at 70° C for 5 hours. Yield was 65 percent. Acrylonitrile content of the polymer was 53 molar percent.

In dimethyl sulfoxide as solvent, $\eta_{SP/C}$ was 0.62 dl/g at 30° C.

The polymer was insoluble in dimethylformamide which is within the hatched area in FIG. 1.

COMPARISON EXAMPLE 7

The procedure of Example 1 was repeated except that a solvent composition comprising 1 part of dimethylformamide and 2 parts of formamide having apparent coordinates ($\delta_H, \delta_P$) of (8.03, 10.77) which is not within the hatched area in FIG. 1 was used in place of dimethyl sulfoxide. The cheese whey permeation velocity was 0.13 m³/m²/day.

The embodiments of the invention in which an exclusive property or privilege is claimed are defined as follows:

1. The method of preparing a semipermeable membrane suitable for ultrafiltration comprising
   dissolving in a solvent a copolymer of 90 to 60 molar percent,
   based on the total monomers, of acrylonitrile and the balance is a non-electrolytic water-soluble vinyl monomer whose homopolymer is also water-soluble, said solvent being selected from the group consisting of
   i a water miscible solvent having hydrogen bond and dipole parameters within the hatched area of FIG. 1, and mixtures thereof, and
   ii a mixture of (i) and an organic water-miscible solvent, and mixtures thereof, in such proportion that the hydrogen bond and dipole parameters of (ii) calculated from weighted averages of the ingredients thereof, are within said hatched area,
   to prepare a membrane-forming solution,
   forming a film of said resulting solution on a surface,
   evaporating said solvent from said film and then immersing said film in ice water to transform same to a semipermeable ultrafiltration membrane.

2. The method of claim 1 in which said vinyl monomer is selected from the group consisting of N-vinyl-2-oxazolidone, N-vinyl-2-pyrrolidone, acrylamide, acryloylmorpholine, hydroxyethyl methacrylate, hydroxypropyl methacrylate, methoxyethyl acrylate, ethoxyethyl methacrylate, 1,2-dihydroxypropyl acrylate, 1,2-dihydroxypropyl methacrylate, 2,3-dihydroxypropyl acrylate, 2,3-dihydroxypropyl methacrylate, 1,3-dihydroxypropyl acrylate and 1,3-dihydroxypropyl methacrylate.

3. The method of claim 2 in which the concentration of said copolymer in said solvent is from 10 to 35 weight percent and said membrane-forming solution has a velosity of from 20 to 600 poises, the membrane-forming solution is spread on a surface having a temperature of 10° to 85° C to form a film, and the solvent is evaporated from the film at a temperature of 10° to 85° C, in a time period from 3 to 300 seconds.

4. The method of claim 3 in which the concentration of said copolymer in said solvent is from 18 to 27 weight percent, said membrane-forming solution has a velocity of from 60 to 200 poises, and the solvent is evaporated from the film at a temperature of 25° to 50° C.

5. The method of claim 3 in which the surface is a smooth glass surface.

6. A semipermeable membrane prepared by the process of claim 3.

7. An article of manufacture suitable for ultrafiltration, a semipermeable membrane comprising a copolymer of 90-60 molar percent of acrylonitrile, based on the total monomers, and the balance is a non-electrolytic water-soluble vinyl monomer whose homopolymer is also water-soluble, said membrane having a velocity of water permeation, for distilled water under a presure of 3 kg/cm², of 1.2 to 100 m³/m²/day.

8. The article according to claim 7 further characterized by having one outer, compact, fine-pored, surface layer and an opposite, outer, large-pored layer the pores of which are open, the pores of said fine-pored surface layer being of suitable size for ultrafiltration, and the pore size of the opposite large-pored layer is at least 10 times as large as the pores of said fine-pored layer.

9. The article of claim 8 wherein the vinyl monomer is a member of the group consisting of N-vinyl-2-oxazolidone, N-vinyl-2-pyrrolidone, acrylamide, acryloylmorpholine, hydroxyethyl methacrylate, hydroxypropyl methacrylate, methoxyethyl acrylate, ethoxyethyl methacrylate 1,2-dihydroxypropyl acrylate, 1,2-dihydroxypropyl methacrylate, 2,3-dihydroxypropyl acrylate, 2,3-dihydroxypropyl methacrylate, 1,3-dihydroxypropyl acrylate and 1,3dihydroxypropyl methacrylate.

10. The article of claim 8 wherein the thickness of the membrane is in the range of about 0.1 to 0.30 mm.

* * * * *

UNITED STATES PATENT AND TRADEMARK OFFICE
CERTIFICATE OF CORRECTION

PATENT NO. : 3 950 257
DATED : April 13, 1976
INVENTOR(S) : Kiyoshi Ishii et al

It is certified that error appears in the above-identified patent and that said Letters Patent are hereby corrected as shown below:

Column 12, line 30; change "velosity" to ---viscosity---.

Column 12, line 38; change "velocity" to ---viscosity---.

Column 13, line 1; change "1,3 dihydroxypropyl" to

---1,3-dihydroxypropyl---.

Signed and Sealed this

Twenty-seventh Day of July 1976

[SEAL]

Attest:

RUTH C. MASON
*Attesting Officer*

C. MARSHALL DANN
*Commissioner of Patents and Trademarks*